US008211517B2

(12) United States Patent
Martens et al.

(10) Patent No.: US 8,211,517 B2
(45) Date of Patent: Jul. 3, 2012

(54) MULTI-LAYERED COEXTRUDED TUBE

(75) Inventors: Marvin M. Martens, Vienna, WV (US);
Annakutty Mathew, Kingston (CA);
Georgios Topoulos, Meyrin (CH)

(73) Assignee: EI du Pont de Nemours and Company, Wilmington, DE (US)

(*) Notice: Subject to any disclaimer, the term of this patent is extended or adjusted under 35 U.S.C. 154(b) by 138 days.

(21) Appl. No.: 12/793,157

(22) Filed: Jun. 3, 2010

(65) Prior Publication Data

US 2010/0307625 A1 Dec. 9, 2010

Related U.S. Application Data

(60) Provisional application No. 61/184,883, filed on Jun. 8, 2009.

(51) Int. Cl.
*B29D 22/00* (2006.01)
(52) U.S. Cl. .............. 428/35.7; 428/36.91; 138/140; 138/137
(58) Field of Classification Search ............ 428/35.7, 428/36.91; 138/140, 137
See application file for complete search history.

(56) References Cited

U.S. PATENT DOCUMENTS

| 4,174,358 | A | * | 11/1979 | Epstein | 525/183 |
| 5,112,908 | A | * | 5/1992 | Epstein | 525/66 |
| 5,219,003 | A | | 6/1993 | Kerschbaumer | |
| 6,094,816 | A | * | 8/2000 | Doshi | 29/890.043 |
| 6,162,317 | A | * | 12/2000 | Cesaroni et al. | 156/244.13 |
| 6,355,769 | B1 | * | 3/2002 | Ng | 528/310 |
| 7,122,255 | B2 | * | 10/2006 | Doshi | 428/474.9 |
| 7,989,526 | B2 | * | 8/2011 | Saga | 524/126 |
| 7,989,538 | B2 | * | 8/2011 | Saga | 524/451 |
| 2004/0191451 | A1 | * | 9/2004 | Doshi | 428/36.91 |
| 2009/0269532 | A1 | | 10/2009 | Ferreiro et al. | |
| 2010/0113656 | A1 | * | 5/2010 | Saga | 524/126 |
| 2010/0307625 | A1 | * | 12/2010 | Martens et al. | 138/140 |
| 2010/0307626 | A1 | * | 12/2010 | Martens et al. | 138/140 |

OTHER PUBLICATIONS

International Search Report dated Aug. 10, 2010, PCT/US2010/037681.

* cited by examiner

*Primary Examiner* — N. Edwards

(57) ABSTRACT

Multi-layered co-extruded tubes are provided that include an outer layer including a first semiaromatic semicrystalline polyamide having a melt temperature of about 240° C. to 280° C., and a thermal stabilizer; and an inner layer including a second semiaromatic semicrystalline polyamide having a glass transition equal to or greater than 100° C.

11 Claims, No Drawings

MULTI-LAYERED COEXTRUDED TUBE

CROSS REFERENCE TO RELATED APPLICATIONS

This application claims the benefit of U.S. Provisional Application No. 61/184,883, filed Jun. 8, 2009, which is incorporated herein by reference in its entirety.

FIELD OF INVENTION

This invention is directed to a multi-layered co-extruded tube including two or more layers of semiaromatic semicrystalline polyamides.

BACKGROUND OF INVENTION

Polyamides are attractive materials to use in many demanding applications because of their mechanical properties and chemical resistance. Many of these applications involve use at high temperatures. For example, components used in the automotive engine compartment such as ducts, fans and fan shrouds, manifolds, tubes, etc. require operation at high temperatures. In all of these applications, it is desirable that the structures and components retain their mechanical properties such as stiffness, strength and creep resistance at high temperatures.

The change in properties of a semicrystalline polymer with temperature is governed by its glass transition temperature. This is a temperature characteristic of a polymer's molecular architecture, when molecules undergo a transition from a glassy state to a rubbery state. The mechanical properties such as stiffness and strength exhibited by a polymer in the glassy state are generally significantly higher than those in the rubbery state.

At high temperatures the rate of thermal oxidative degradation of a polymer part is higher, leading to loss of mechanical properties at a faster rate. The degradation causes surface embrittlement of any surface exposed to air. Surface embrittlement has a severe effect on the physical properties of the tubes and pipes since external bending and flexing loads typically give rise to high stress concentrations at the surface.

A common approach to retarding oxidative degradation of polyamides is to use thermal stabilizers, at low levels, dispersed throughout the polymer matrix. The thermal oxidation stabilizers used in polyamides generally fall into three groups: (i) organic stabilizers based on aromatic amines, (ii) organic stabilizers based on hindered phenols sometimes in combination with phosphorous based compounds, and (iii) inorganic stabilizers based on copper and halogen compounds. The organic stabilizers are often not suitable for incorporation into polyamides that need to be processed at temperatures close to 300° C. or higher, as they tend to volatilize or decompose. Copper based inorganic stabilizers are also not suitable because they lead to degradative reactions at these high temperatures. This is especially true in processes such as extrusion, blow molding, casting, film blowing etc. that involve exposure of the polymer melt to atmospheric conditions.

U.S. Pat. No. 5,219,003 discloses a tube with low-temperature impact resistance that is suitable for conveying motor vehicle engine fuel and that comprises three layers that are made from at least two mutually compatible polyamides. The inner and outer layers contain impact modifiers and the middle layer contains substantially none.

U.S. Pat. No. 7,122,255 discloses multi-layered polyamide composite articles comprising at least three layers that comprise aliphatic and semi-aromatic polyamides and that is better able to retain its mechanical properties at high temperatures and over long times are disclosed. Layers comprising aliphatic polyamides may optionally contain oxidation stabilizers. The articles may be in the form of tubes incorporated into a heat exchanger.

Tubes fabricated from polyamides that simultaneously offer improved retention of mechanical properties at high in-use temperatures and stabilization against thermal degradation are needed. Additionally tubes having a variation in composition and physical properties through the thickness of the tube may be useful and available by co-extrusion processing. However, the variation in thermal processing required for various polymer compositions having widely disparate thermal properties in co-extrusion processes lead to significant manufacturing problems.

The object of the present invention is to provide multilayered co-extruded tube comprising a plurality of layers of polyamides and process for the manufacture of these articles such that the problems associated with the incorporation of commonly available thermal stabilizers into the polyamides, the retention of the tube's mechanical properties at high in-use temperatures, and the manufacturing issues of co-extruded tubes are simultaneously addressed.

SUMMARY OF INVENTION

There is disclosed and claimed herein a multi-layered co-extruded tube comprising
A) an outer layer comprising a first polymer composition comprising a first semiaromatic semicrystalline polyamide and a copper thermal stabilizer, said first semiaromatic semicrystalline polyamide consisting essentially of
  a) at least one repeat unit derived from monomers selected from the group consisting of:
    (i) aromatic dicarboxylic acid having 8 to 20 carbon atoms and at least one aliphatic diamine having 6 to 12 carbon atoms, and
  b) at least one repeat unit derived from monomers selected from one or more of the group consisting of:
    (ii) at least one aliphatic dicarboxylic acid having 10 to 14 carbon atoms and at least one aliphatic diamine having 6 to 12 carbon atoms, and
    (iii) at least one lactam and/or aminocarboxylic acid having 6 to 20 carbon atoms; and
B) an inner layer comprising a second polymer composition comprising a second semiaromatic semicrystalline polyamide;
wherein said first semiaromatic semicrystalline polyamide has a melt temperature of about 240° C. to 280° C.; and said second semiaromatic semicrystalline polyamide has a glass transition equal to or greater than 100° C. as measured with dynamic mechanical analysis using ISO-6721-3 method.

DETAILED DESCRIPTION OF THE INVENTION

The outer layer of the multi-layered tube set forth herein comprises a first polymer composition comprising a first semiaromatic semicrystalline polyamide and a copper thermal stabilizer. The first semiaromatic semicrystalline polyamide useful in the invention is one or more copolymers, terpolymers, or higher polymers that are derived from dicarboxylic acid monomers containing aromatic groups. Examples of monomers containing aromatic groups are terephthalic acid and its derivatives and isophthalic acid and its derivatives. It is preferred that about 40 to about 80 mole percent of the dicarboxylic acid monomers used to make the first semiaromatic semicrystalline polyamide are monomers containing aromatic groups, and, more preferably, about 50 to about 80 mole percent of the monomers contain aromatic groups. The remaining dicarboxylic acid monomers used in making the first semiaromatic semicrystalline polyamide are selected from one or more aliphatic dicarboxylic acid having 10 to 14 carbon atoms such as decanedioic acid, dodecanedioic acid and tetradecanedioic acid. The diamines useful in making the first semiaromatic semicrystalline are aliphatic diamines having 6 to 12 carbon atoms including hexamethylenediamine; 2-methylpentamethylenediamine; 2-methyloctamethylenediamine; trimethylhexamethylenediamine; 1,8-diaminooctane; 1,9-diaminononane; 1,10-diaminodecane; 1,12-diaminododecane. Other repeat units used in making the first semiaromatic semicrystalline polyamide are selected from one or more lactams or amino acids such as 11-aminododecanoic acid, caprolactam, and laurolactam.

The first semiaromatic semicrystalline polyamide has a melt temperature of about 240° C. to 280° C. and preferably about 250° C. to 280° C. The melt temperature defined herein is the melting point of the polyamide determined using differential scanning calorimetry (DSC) at a scan rate of 10° C./min (under nitrogen). The melting point is defined as the point of maximum endotherm in the melting transition in the first heating cycle of the DSC.

The first semiaromatic semicrystalline polyamide preferably has at least about 40 μeq/g of amine ends, or more preferably at least about 50 μeq/g, or yet more preferably at least about 60 μeq/g of amine ends. Amine ends may be determined by titrating a 2 percent solution of polyamide in phenol/methanol/water mixture (50:25:25 by volume) with 0.1 N hydrochloric acid. The end point may be determined potentiometrically or conductometrically. (See Kohan, M.I. Ed., *Nylon Plastics Handbook*, Hanser: Munich, 1995; p. 79 and Waltz, J.E.; Taylor, G.B. *Anal. Chem.,* 1947, 19, 448-50).

The semiaromatic polyamide in the outer layer may be selected from the group consisting of Group I polyamides having a terephthalic acid content of 60 to about 80 mol %, based on the total dicarboxylic acid content, selected from the group consisting of decamethylene terephthalamide/decamethylene decanediamide and decamethylene terephthalamide/decamethylene dodecanediamide; and Group II polyamides having a terephthalic acid content of 50 to about 80 mol %, based on the a total of acid repeat units, selected from the group consisting of nonamethylene terephthalamide/nonamethylene decanediamide, nonamethylene terephthalamide/nonamethylene dodecanediamide, nonamethylene terephthalamide/11-aminoundecanamide (PA 9T/11), nonamethylene terephthalamide/lauryl lactam, decamethylene terephthalamide/-aminoundecanamide (PA 10T/11), and decamethylene terephthalamide/lauryl lactam. The "total of acid repeat units" referred to in Group II polyamides refers to the summation of repeat units based on terephthalic acid, other aliphatic dioic acids, and amino-carboxylic acid and lactam repeat units in the polyamide.

The inner layer of the multi-layer tube comprises a second polymer composition comprising a second semiaromatic semicrystalline polyamide. The second semiaromatic semicrystalline polyamide useful in the invention is one or more homopolymers, copolymers, terpolymers, or higher polymers that are derived from dicarboxylic acid monomers containing aromatic groups, as disclosed above. It is preferred that about 70 to about 100 mole percent of the dicarboxylic acid monomers used to make the second semiaromatic semicrystalline polyamide are monomers containing aromatic groups, and, more preferably, about 80 to about 100 mole percent of the dicarboxylic acid monomers contain aromatic groups. The remaining dicarboxylic acid monomers used in making the second semiaromatic semicrystalline polyamide are selected from one or more aliphatic dicarboxylic acid having 6 to 14 carbon atoms such as adipic acid, octandioic acid, nonanedioic acid, decanedioic acid, dodecanedioic acid and tetradecanediioic acid. The diamines useful in making the second semiaromatic semicrystalline polyamide are aliphatic diamines having 6 to 12 carbon atoms including hexamethylenediamine, 2-methylpentamethylenediamine, 2-methyloctamethylenediamine, trimethylhexamethylenediamine, 1,8-diaminooctane, 1,9-diaminononane, 1,10-diaminodecane, and 1,12-diaminododecane. Other repeat units used in making the second semiaromatic semicrystalline polyamide are selected from one or more lactams or amino acids such as 11-aminododecanoic acid, caprolactam, and laurolactam.

The second semiaromatic semicrystalline polyimide may consist essentially of c) at least one repeat unit derived from monomers selected from the group consisting of (iv) aromatic dicarboxylic acid having 8 to 20 carbon atoms and at least one aliphatic diamine having 6 to 10 carbon atoms, and optionally d) one or more repeat units derived from monomers selected from the group consisting of (v) aliphatic dicarboxylic acid having 6 to 14 carbon atoms and at least one aliphatic diamine having 6 to 10 carbon atoms, and (vi) lactam and/or aminocarboxylic acid having 6 to 20 carbon atoms The second semiaromatic semicrystalline polyamide has a glass transition temperature equal to or greater than 100° C., and preferably equal to or greater than 125° C., as measured with dynamic mechanical analysis using ISO-6721-3 method, wherein the glass transition is measured at the peak of the Tan delta curve.

In various embodiments the second semiaromatic semicrystalline polyamide has a melt temperature equal to or greater than 270° C., 280° C., 290° C. and equal to or greater than 300° C. The melt temperature is measured with DSC as disclosed above.

The semiaromatic polyamide for the inner layer may be selected from the group consisting of hexamethylene terephthalamide/2-methylpentamethylene terephthalamide copolyamide (polyamide 6,T/D,T), hexamethylene terephthalamide/hexamethylene isophthalamide (polyamide 6,T/6, I), hexamethylene adipamide/hexamethylene terephthalamide/hexamethylene isophthalamide copolyamide (polyamide 6,6/6,T/6,I); hexamethylene terephthalamide/poly(caprolactam) (polyamide 6,T/6) poly(nonamethylene terephthalamide) (polyamide 9,T), and poly(decamethylene terephthalamide) (polyamide 10,T), A selection of useful second semiaromatic semicrystalline polyamides that meet the thermal requirements for the inner layer are listed in Table 1. It will be readily appreciated by those skilled in the art that the measurement of Tg's is a somewhat imprecise process and, hence, that the numbers shown in Table 1 are approximate and provided for purposes of illustration.

TABLE 1

SemiAromatic Semicrystalline Polyamides Useful for the Inner Layer

| Polyamide[1] | Monomers used with relative molar amounts given in parentheses | Tg (° C.) | Melting Point (° C.) |
|---|---|---|---|
| 6T/DT | HMD(50):2-MPMD(50):TPA(100) | 135 | 300 |
| 6T/6 | HMD(70):TPA(70):Capro(30) | 105 | 295 |
| 6T/6I | HMD(100):TPA(70):IPA(30) | 125 | 320 |
| 6T/6I/66 | HMD(100):TPA(60):IPA(30):AA(10) | 125 | 315 |
| 9T | 1,9-Diaminononane:TPA(100) | 125 | 308 |
| 10T | DMD(100):TPA(100) | 100 | 318 |

[1]The copolyamides in this column are made from the ingredients given in the corresponding row of the second column used in the relative molar amounts indicated beside each ingredient.

The following abbreviations have been used in Tables 1:

| | |
|---|---|
| HMD | Hexamethylenediamine |
| 2-MPMD | 2-Methyl-1,5-pentanediamine |
| TPA | Terephthalic acid |
| AA | Adipic acid |
| DMD | Decamethylenediamine |
| Capro | ε-Caprolactam |
| DDA | Decanedioic acid |
| IPA | Isophthalic acid |
| 6T | polymer molecular unit formed from HMD and TPA |
| DT | polymer molecular unit formed from 2-MPMD and TPA |
| 66 | polymer molecular unit formed from HMD and AA |
| 10T | polymer molecular unit formed from DMD and TPA |
| 9T | polymer molecular unit formed from 1,9-diaminononane and TPA |

6 polymer molecular unit formed from ε-caprolactam

The semiaromatic polyamide for the inner layer may be selected from the group consisting of hexamethylene terephthalamide/2-methylpentamethylene terephthalamide copolyamide (polyamide 6,T/D,T), hexamethylene terephthalamide/hexamethylene isophthalamide (polyamide 6,T/6,I. In a preferred embodiment the second semi-aromatic semi-crystalline polyamide for the inner layer consists essentially of (c) repeat units (iv) wherein said at least one aliphatic diamine has 6 carbon atoms.

The second polymer composition for the inner layer may have a tensile modulus greater than 800 MPa, preferably greater than 1000 MPa, and more preferably greater than 1200 MPa, when measured at 125° C. The tensile modulus, as herein defined, is determined with ISO 527-2/1B/1 method. Flexural modulus can be used to define the stiffness of the inner layer. Flexural modulus is typically about 10 to 25% lower value than the tensile modulus. Thus, a tensile modulus of 1000 MPa typically corresponds to a flexural modulus of about 750 to 900 MPa. Alternatively, flexural modulus can be measured directly using ISO 178-75 method.

A preferred semiaromatic polyamide for the inner layer is hexamethylene terephthalamide/2-methylpentamethylene terephthalamide copolyamide (polyamide 6,T/D,T). This polyamide is commercially available as Zytel® HTN501 available from E.I. du Pont de Neumours, Wilmington, Del.

The first polymer composition used in the outer layer comprises a copper thermal stabilizer. Preferably the copper thermal stabilizer comprises about 0.1 to about 1.0 weight percent of a copper species selected from Cu(I), Cu(II), or a mixture thereof, preferably about 0.3 to about 1.0 weight percent of the copper species, based on the total weight of the first polymer composition. The above weight percent range of copper species includes the weight of the copper species only, and is not meant to include the weight of the counter ion, for instance, halide, acetate, oxide, etc. The counter ion weight is included in the calculation of the total first polymer composition weight. In an embodiment the copper species is selected from the group consisting of copper iodide, copper bromide, copper chloride, copper fluoride; copper thiocyanate, copper nitrate, copper acetate, copper naphthenate, copper caprate, copper laurate, copper stearate, copper acetylacetonate, and copper oxide. The copper species may be a copper halide selected from copper iodide, copper bromide, copper chloride, and copper fluoride. A preferred copper species is copper iodide.

The first polymer composition used in the outer layer additionally may include about 0.1 to about 1.0 weight percent of an metal halide salt selected from LiI, NaI, KI, $MgI_2$, KBr, and $CaI_2$. A preferred metal halide is KI or KBr.

The first polymer composition used in the outer layer may also optionally contain other thermal stabilizers that are dispersed throughout the volume of the polyamide as uniformly as possible by the conventional means of incorporation such as melt compounding. The lower melting point and correspondingly lower melt processing temperature of these polyamides allow the incorporation of thermal stabilizers that do not themselves undergo excessive degradation or volatilization, nor do they cause excessive degradation of the polyamide during the incorporation step or during subsequent processing required for the manufacture of the tube.

Thermal stabilizers, other than copper thermal stabilizers, that may be used, are as described in *Plastics Additives Handbook*, edited by Gachter and Muller. Appropriate thermal stabilizers include aromatic amines such as N,N'-dinaphthyl-p-phenylenediamine or N-phenyl-N'-cyclohexyl-p-phenylenediamine, which are preferably used at loadings of about 0.5 to 2 weight percent; and hindered phenols such as N,N'-hexamethylene-bis-3-(3,5-di-tert-butyl-4-hydroxyphenyl)propionamide that are preferably used at loadings of 0.3 to 2 weight percent.

The second semi-aromatic semi-crystalline polyamide for the inner layer have high melting points and glass transition temperatures, that maintain their physical properties at high temperatures. However, the high melting points require high processing temperatures wherein use of copper heat stabilizers typically cause excessive degradation of the polyamide physical properties. The second polymer composition used in the inner layer preferably does not contain a Cu thermal stabilizer. The second polymer composition is considered not to contain a Cu thermal stabilizer when analysis, as determined with atomic absorption spectroscopy, indicates there is less than 100 ppm copper species.

Improvement of impact strength, or toughness, of polyamide resins has long been of interest. Resistance to shattering or brittle breaking on impact of polyamide molded articles is a desirable feature of any molded article. Any tendency to break on impact in a brittle fashion (rather than ductile fashion) is a significant limitation on the usefulness of such articles. Breaks in ductile materials are characterized more by tearing with a large volume of adjacent material yielding at the edge of the crack or tearing rather than a sharp, clean break with little molecular displacement. A resin having good ductility is one that is resistant to crack propagation caused by impact.

Thus, a preferred optional ingredient in the first polymer composition used in the outer layer and the second polymer composition used in the inner layer is a polymeric toughening agent. One type of polymeric toughening agent is a polymer, typically though not necessarily an elastomer, which has attached to it functional groups which can react with the polyamide (and optionally other polymers present) to produce a compounded multiphase resin with improved impact strength versus the untoughened polyamide. Some functional groups that can react with polyamides are carboxyl (—COOH), metal-neutralized carboxyl, amine, anhydride, epoxy, and bromine. Since polyamides usually have carboxyl (—COOH) and amine groups present, these functional groups usually can react with carboxyl and/or amine groups. Such functional groups are usually "attached" to the polymeric toughening agent by grafting small molecules onto an already existing polymer or by copolymerizing a monomer containing the desired functional group when the polymeric toughener molecules are made by copolymerization. As one example of grafting, maleic anhydride may be grafted onto a hydrocarbon rubber using free radical grafting techniques. The resulting grafted polymer has carboxylic anhydride and/or carboxyl groups attached to it.

A variety of additives have been added to polyamide resins to improve strength and ductility. For example, U.S. Pat. No. 4,174,358, issued Nov. 13, 1979 to Epstein, describes improving impact strength and ductility by adding a selected random copolymer which adheres to the polyamide. In U.S. Pat. No. 5,112,908, issued May 12, 1990, Epstein teaches that in certain polymeric toughening agents for polyamides, the sites that promote adhesion with polyamide ("graft sites") preferably will be present as metal-neutralized carboxyl, adjacent carboxyl (i.e., a carboxylic acid monomer unit adjacent to a metal-neutralized carboxyl monomer unit), anhydride, or epoxy functional groups, but other functional sites such as sulfonic acid or amine may be effective. These sites will be present in amounts that provide the requisite grafting.

A preferred polymeric toughening agent is a copolymer of ethylene, propylene and 1,4-hexadiene and, optionally, norbornadiene, said copolymer having grafted thereto an unsaturated monomer taken from the class consisting of fumaric acid, maleic acid, maleic anhydride, the monoalkyl ester of said acids in which the alkyl group of the ester has 1 to 3 carbon atoms. For example, one such polymer is TRX 301, available from the Dow Chemical Company (Midland, Mich., USA).

Another type of polymeric toughening agent is an ionomer that contains certain types of ionic groups. The term "ionomer" as used herein refers to a polymer with inorganic salt groups attached to the polymer chain (Encyclopedia of Polymer Science and Technology, 2nd ed., H.F. Mark and J. I. Kroschwitz eds., vol. 8, pp. 393-396). Ionomers that act as polyamide toughening agents contain ionic groups which do not necessarily react with the polyamide but toughen through the compatibility of those ionic groups with the polyamide, which is caused by the solubility of the ions (for example, lithium, zinc, magnesium, and manganese ions) in the polyamide melt. A preferred polymeric toughening agent of this type is an ionomer of units derived from alpha-olefin having the formula $RCH=CH_2$ wherein R is H or alkyl having from 1 to 8 carbon atoms and from 0.2 to 25 mole percent of units derived from an alpha, beta-ethylenically unsaturated mono- or dicarboxylic acid, at least 10% of the acid groups of said units being neutralized by metal ions having a valence of from 1 to 3, inclusive. Preferably, the ionomer will be a copolymer of ethylene and acrylic or methacrylic acid at least 10% neutralized by metal ions such as $Li^+$, $Zn^{+2}$, $Mg^{+2}$, and/or $Mn^{+2}$. For example, one such polymer is DuPont™ Surlyn® resin series available from E.I. du Pont de Nemours & Co., Inc., Wilmington, Del., USA.

In addition to the polymeric toughening agents described above, two halogenated elastomers have been identified as effective toughening agents for polyamides, namely, a halogenated isobutylene-isoprene copolymer, and a brominated poly(isobutylene-co-4-methylstyrene). The latter is commercially available as Exxpro™ polymers from Exxon Mobil Chemical (Houston, Tex., USA). It is believe to adhere to the polyamide by reaction of its benzylic bromines with polyamide amine end groups or amide groups [Li, D.; Yee, A.F.; Powers, K.W.; Wang, H.C.; Yu, T.C., Polymer, 34, 4471-(1993)].

The first polymer composition may further comprise about 2 to about 50 weight percent of a polymeric toughener based on the total weight of the first polymer composition. In other embodiments the first polymer composition may comprise 10 to 50 weight percent, 10 to about 40 weight percent, and 10 to about 30 weight percent of a polymeric toughener The second polymer composition may further comprise about 2 to about 50 weight percent of a polymeric toughener based on the total weight of the second polymer composition. In other embodiments the second polymer composition may comprise 10 to 50 weight percent, 10 to about 40 weight percent, and 10 to about 30 weight percent of a polymeric toughener.

The first polymer composition and the second polymer composition may both comprise about 2 to about 50 weight percent of a polymeric toughener based on the total weight of the first polymer composition. In other embodiments the first and second polymer composition may comprise 10 to 50 weight percent, 10 to about 40 weight percent, and 10 to about 30 weight percent of a polymeric toughener The polymeric toughening agent may comprise a mixture of 2 or more polymers, at least one of which must contain reactive functional groups or ionic groups as described above. The other(s) may or may not contain such functional groups or ionic groups. For instance, a preferred polymeric toughening agent for use in the compositions described herein comprises a mixture of an ethylene/propylene/hexadiene terpolymer grafted with maleic anhydride and a elastomeric polyethylene such as Engage® 8180, an ethylene/1-octene copolymer grafted with maleic anhydride available from the Dow Chemical Company (Midland, Mich., USA).

The first and/or second polymer compositions may, optionally, include 0 to 20 weight percent of one or more organic additives selected from the group consisting of lubricants, flow modifiers, heat stabilizers other than copper heat stabilizers, antioxidants, dyes, pigments, and UV stabilizers, and the like, provided that they don't negatively impact the physical properties or surface properties of the co-extruded tube.

The first and/or second polymer compositions described herein can be made by typical melt mixing techniques. For instance, the ingredients may be added to a single or twin screw extruder or a kneader and mixed in the normal manner. After the materials are mixed, they may be formed (cut) into pellets or other particles suitable for feeding to a extrusion machine. Some of the ingredients such as the copper species, fillers, plasticizers, and lubricants (mold release) may be added at one or more downstream points in the extruder, so as to decrease attrition of solids such as fillers, and/or improve dispersion, and/or decrease the thermal history of relatively thermally unstable ingredients, and/or decrease losses by evaporation of volatile ingredients.

The present invention also provides a process for fabrication of the multi-layered co-extruded tube. In a multi-layer co-extrusion process, separate extruders are used to extrude each type of polyamide. The temperature settings and other processing conditions for the extruders are arranged such that they are appropriate to the polyamide being extruded. This avoids having to expose the lower melting polyamides to higher than normal processing temperatures during the extrusion step while allowing the extrusion of higher melting polyamide at a suitable temperature.

The individual melts from the extrusion streams are combined together in a properly designed die and arranged in the desired multi-layer arrangement. Only the die needs to be maintained at the higher processing temperature required for the semi-aromatic polyamide used for an inner layer. Because the residence time in the die is very brief, the undesired degradative effects in the lower melting stabilized polyamide are strongly minimized. The die can be designed to provide multilayered extrudates in a variety of shapes. The extrudate can be solidified in a cooling or a quench tank.

If so desired, to optimize the degree of retention of physical properties at elevated temperatures, the crystallinity of the inner layer may be increased by subjecting the article to an in-line or a separate annealing step. The annealing step can involve briefly reheating the article to a temperature slightly above the glass transition temperature of the polyamide composition in the inner layer and can be done in an oxygen-free environment if desired.

The present invention will become better understood upon having reference to the examples and comparative examples herein.

EXAMPLES

Methods

Dynamic Mechanical Analysis

Glass transition ($T_g$) was determined using a METRAVIB VA4000 dynamic mechanical analyzer (Lyon, France) using 150-6721-3 method. The $T_g$ was measured at the peak of the Tan delta curve.

Differential Scanning Calorimetry (DSC)

A Differential scanning calorimeter, TA Instruments Q1000 MDSC (Modulated DSC) operating in "Standard Mode" was used to determine the melting point of the polyamide resins. The melting point was measured at the peak of the melting endotherm using a scan rate of 10° C./min.

Hydrostatic Burst Pressure

A Barbee burst pressure instrument (Barbee, Inc., Chula Vista, Calif.) with a hand operated water pump was used for the measurements. The maximum pressure causing the tube failure was recorded as the burst pressure.

For 23° C. burst testing, one end of a 30 cm long tube piece was attached to the discharge side of the pump hose using a Swagelok® fitting, first keeping the other end open. Water was pumped to displace the air inside the tube piece. Once the tube was filled, the open end of the tube was capped with a closed-end Swagelok fitting. The tube piece was then pressurized by operating the pump until the burst occurred.

For 125° C. burst testing, one end of the 30 cm long tube piece was attached to the discharge side of the pump hose using a Swagelok® fitting. The other end of the tube was capped with a closed-end Swagelok® fitting. The air was thus present in the tube. The tube piece was positioned inside an air-circulating oven through an opening in the side of the oven. This opening was otherwise sealed off using a piece of insulation. The pump and some length of the connecting hose were outside the oven. The oven was preheated to the desired test temperature of 125° C. prior to positioning the test piece. The tube piece was left in the oven for at least 1 hour for it to come up to and stabilize at the test temperature. The water piece was pressurized by operation of the pump. The water pressure exerted by the pump in turn compressed and pressurized the hot air inside the tube piece and caused the burst.

It was judged that this method better prevented cool down of the tube piece by the room temperature water during pressurization.

Tensile Strength of Tubes

The tensile strengths of the tubing samples were determined at several temperatures over the range of 23 to 125° C. using an Instron tester. 8 m long pieces were used with a gauge distance of 5 cm between the two grips of the tester. The ends of the tubing pieces were held in the grips using specially designed V-groove jaws, and short cylindrical steel pins were inserted in the ends of the tubing to prevent the pinching and crushing of the tubing in the grips. The tests were carried out using a tester crosshead rate of 50 mm/sec and stress vs strain curves were generated.

Mechanical Properties

Tensile modulus was determined using ISO 527-2/1B/1

Charpy Impact Notched properties were determined using ISO 179/1eU.

Air Oven Aging (AOA)

Compositions were molded into 4 mm thick tensile bars. The tensile bars were placed in a circulating air oven at 135° C. for the times noted in the Tables below. Oven location effects were averaged by continuously rotating the bars on a carousel. At the end of the specified time period, the tensile bars were removed from the oven and tested for tensile strength and elongation according to ISO 527-2/1B/1.

Materials

C-Black refers to a 25 weight percent carbon black composition dispersed in polyamide 6.

HS 7.1.0.5 is a heat stabilizer consisting of 7 parts potassium iodide, 1 part copper (I) iodide and 0.5 part aluminum distearate was purchased from Shepherd Chemical Co. (Shepherd Norwood, 4900 Beech Street, Norwood, Ohio 45212).

Polyamide A, a copolyamide of 10T/1010 in a 65/35 molar ratio, was prepared using the following procedure:

A 10 L autoclave was charged with terephthalic acid (1199.5 g), sebacic acid (786.3 g), 1,10-diaminodecane (2017.1 g), an aqueous solution containing 1 weight percent sodium hypophosphite (35.0 g), an aqueous solution containing 28 weight percent acetic acid (95.0 g), an aqueous solution containing 1 weight percent Carbowax 8000 (10.2 g), and water (2500 g). The autoclave agitator was set to 5 rpm and the contents were purged with nitrogen at 10 psi for 10 minutes. The agitator was then set to 50 rpm, the pressure control valve was set to 300 psig, and the autoclave was heated. The pressure reached 300 psig within 45 minutes and was held there for another 90 minutes until the temperature of the contents had reached 265° C. The pressure was then reduced to 0 psig over about 45 minutes. During this time, the temperature of the contents rose to 285° C. The autoclave pressure was reduced to 5 psia by applying vacuum and held there for 20 minutes. The autoclave was then pressurized with 70 psig nitrogen and the molten polymer was extruded into strands, quenched with cold water and cut into pellets. The copolyamide obtained had an inherent viscosity (IV) of 1.09 dl/g. In this case, IV was measured on a 0.5% solution in m-cresol at 25° C. The polymer had a melting point of 274° C., as measured by differential scanning calorimetry (DSC). Several batches of polymer prepared according to the above procedure were dry-blended to provide a Polyamide A having an average of 65 μeq/g of amine ends and an IV of 1.08 dL/g.

Polyamide B is Zytel® HTN 501, a copolyamide of 6T/DT 50/50 molar ratio having an IV of 0.85-0.91 and a melting point of about 300° C., available from E.I. du Pont de Nemours and Company, Wilmington, Del.

Polyamide 10/10 is Zytel® RS LC1000 BK resin, having a melting point of about 200° C., available from E.I. du Pont de Nemours and Company, Wilmington, Del.
Polyamide 6/12 is Zytel® 158 NC010 resin, having a melting point of about 218° C., available from E.I. du Pont de Nemours and Company, Wilmington, Del.
Acrawax C mold release agent is supplied by Lonza Chemicals.
Chimassorb® 944 (poly[[6-[(1,1,3,33-tetramethylbutyl) amino]-1,3,5-triazine-2,4-diyl][(2,2,6,6-tetramethyl-4-peperidinyl)-imino]-1,6-hexanediyl[(2,2,6,6-tetramethyl-4-piperidinyl)imino]]), supplied by Ciba Specialty Chemicals, Tarrytown, N.Y.
Egage® 8180 is an ethylene/1-octene copolymer with 42 weight percent comonomer manufactured by the Dow Chemical Company (Midland, Mich., USA).
Irganox® 1010 is an antioxidant manufactured by Ciba Specialty Chemicals, Inc., Tarrytown, N.Y.
Irganox® 1098 is an antioxidant manufactured by Ciba Specialty Chemicals, Inc., Tarrytown, N.Y.
Irgafos 12 UV light stabilizer is available from Ciba Specialty Chemicals, Tarrytown, N.Y.
NvlostabS-EED® stabilizer refers to a heat and light stabilizer available from Clariant.
Rilsan® AESNO TL polyamide 12 is available from Arkema, Inc.
TRX 301 refers an ethylene/propylene/hexadiene terpolymer grafted with 1.8 weight percent maleic anhydride, was purchased from Dow Chemical (Midland, Mich., USA).

Example 1

This Example illustrates the formation of a two-layer coextruded tube.

The polyamide compositions used in the outer layer and inner layer are listed in Table 2. The outer layer contained copper-based heat stabilizers. No copper-based heat stabilizer was present in the inner layer. The melting point for the Polyamide B used in the inner layer was about 300° C., and the glass transition temperature as measured by DMA was 140° C.

TABLE 2

Compositions of outer and inner layers of Example 1

| Material | Outer Layer | Inner Layer |
|---|---|---|
| Polyamide A | 77.68 | |
| Polyamide B | | 77.95 |
| TRX-301 | 12 | 12 |
| Engage ® 8180 | 8 | 8 |
| C-Black | 1 | 1 |
| Irganox ® 1010 | 0.2 | 0.2 |
| Irganox ® 1098 | 0.2 | 0.25 |
| Irgafos 12 | | 0.3 |
| Chimassorb ® 944 | | 0.2 |
| Acrawax C | 0.1 | 0.1 |
| HS 7.1.0.5 | 0.82 | |
| Total | 100 | 100 |

Comparative Example C-1

Rilsan® AESNO TL polyamide 12 resin having a melting point of about 171° C. and a glass transition of about 40° C. was extruded into a single layer 8.06 mm OD tube with an average wall thickness of about 0.99 mm.

Example 1 physical properties of the outer layer (first polymer composition) and the inner layer (second polymer composition) are listed in Table 3, along with that of the composition used in comparative Example C-1. The tensile properties, measured at 125° C., are significantly higher for the inner layer (second polymer composition) than for the outer layer (first polymer composition) or C-1; and the toughness of the inner layer is significantly better than that of C-1 at 23° C.

TABLE 3

Physical Properties of outer and inner layers of Example 1 and Comparative Example C-1

| | Example No. | | |
|---|---|---|---|
| | 1 - Outer layer | 1-inner layer | C-1 |
| Tensile [a] DAM/23° C. | | | |
| Tensile Modulus (MPa) | 1377 | 1766 | 1532 |
| Stress at Yield (MPa) | 46 | 56.3 | 48.2 |
| Strain at Yield (%) | 5.6 | 6.5 | 4.7 |
| Stress at Break (MPa) | 38 | 48.3 | 39.3 |
| Strain at Break (%) | 92.2 | 31.1 | 174.9 |
| Tensile [a] DAM/125° C. | | | |
| Tensile Modulus (MPa) | 150 | 1392 | 194 |
| Stress at Yield (MPa) | ny | 35.1 | ny |
| Strain at Yield (%) | ny | 3.7 | ny |
| Stress at Break (MPa) | 15 | 35.1 | 17 |
| Impact [b] DAM//23° C. | | | |
| Charpy Impact Notched (kJ/m$^2$) | 72.2 | 73.9 | 8.8 |
| Charpy Impact Unnotched (kJ/m$^2$) | 220.3 | 218.2 | 278.7 |
| Impact [b] DAM//−40° C. | | | |
| Charpy Impact Notched (kJ/m$^2$) | 13.6 | 18.8 | 9.9 |
| Charpy Impact Unnotched (kJ/m$^2$) | 365.4 | 223.3 | 91.9 |

[a] ISO 527-2/1B/1 method
[b] ISO 179/1eU method
ny = no yield

A multi-layer tube was provided by a multilayer extrusion process consisting of two Maillefer extruders equipped with 45 mm screws which fed respective polymers to a single multilayer tubing head set up in a two layer configuration in order to make a tube with a wall having two layers. The temperature of each extruder barrel adjusted to accommodate the particular polymer composition. The barrel feeding the inner layer polymer was set up to 320° C. while the barrel with the outer layer polymer was set up around 20° C. above the melting temperature of the first polymer composition. This was from 220° C. to 280° C. depending on polymer used. The head temperature was set up from 310° C. to 320° C. The die temperature was set up from 310° C. to 320° C. The die diameter was 16.95 mm and the tip diameter was 12.7 mm. The sizer for the outside tube diameter was having 8.7 mm inner diameter. The inner diameter was about 6 mm and was controlled by the extrusion speed and tube drawing ratio. The extruded tube was formed to the dimension in a vacuum tank and then passed through a water bath to solidify being pulled of by a puller. The line speed was about 12 m/min. The thickness of the outer layer was 0.5 mm. The thickness of the inner layer was 0.5 mm.

Comparative Example C-2

The outer layer of Example 1 was extruded into a single layer 8.4 mm OD tube with an average wall thickness of about 0.84 mm.

Comparative Example C-3

The inner layer of Example 1 was extruded into a single layer 8.57 mm OD tube with an average wall thickness of about 0.1.07 mm.

The physical properties of the multi-layered tube of example 1 and the comparative examples C-1-C-3 tube are listed in Table 4; and the burst pressure properties are listed in Table 5.

TABLE 4

Physical Properties of Tubes

| Example No. | 1 | C-1 | C-2 | C-3 |
|---|---|---|---|---|
| Tensile Properties DAM/23° C. | | | | |
| Tensile Modulus (MPa) | 1404 | 931 | 1094 | 1536 |
| Stress at Yield (MPa) | 43.5 | 37 | 35 | 48 |
| Strain at Yield (%) | 6.6 | 8.3 | 5.5 | 8.2 |
| Stress at Break (MPa) | 37.1 | 35 | 35 | 44 |
| Strain at Break (%) | 61.1 | 173 | 140 | 94.7 |
| Impact Properties DAM/−40° C., 7.5 J | | | | |
| Charpy Impact Notched (kJ/m$^2$) | NB | NB | NB | NB |
| Charpy Impact Unnotched (kJ/m$^2$) | NB | NB | NB | NB |
| Impact Properties After anneal 2 h @ 150° C., −40° C., 7.5 J | | | | |
| Charpy Impact Notched (kJ/m$^2$) | NB | NM | NM | NB |
| Charpy Impact Unnotched (kJ/m$^2$) | NB | NM | NM | NB |

DAM = dry as molded
NB = no break
NM = not measured

TABLE 5

Burst Pressure of Tubes

| Example No. | 1 | C-1 | C-2 | C-3 |
|---|---|---|---|---|
| Burst Pressure @ 23° C. (Mpa) | 103,700 | 116,300 | 81,600 | 108,300 |
| Average wall thickness (mm) | 1.00 | 0.99 | 0.84 | 1.07 |
| @ 125° C. (Mpa) | 31,700 | 22,100 | 17,000 | 45,400 |
| Average wall thickness (mm) | 1.00 | 1.00 | 0.84 | 1.07 |

The results indicate the co-extruded tube of Example 1 has superior burst pressure properties to that of polyamide 12 resin (C-1) or the outer layer alone (C-2) at 125° C. The results further indicate that the co-extruded tube of Example 1 has tensile modulus superior to polyamide 12 resin (C-1) and the outer layer alone (C-2); and the Example 1 tensile modulus is comparable to the inner layer alone (C-3).

Comparative Example C-4

A multi-layer tube was provided by a multilayer extrusion process using a polyamide 10/10 as the outer layer, having a melting point of about 200° C.; and the inner layer composition Polyamide B.

Comparative Example C-5

A multi-layer tube was provided by a multilayer extrusion process using a polyamide 6/10 as the outer layer, having a melting point of about 218° C.; and the inner layer composition Polyamide B.

The outer surface smoothness of C-4 and C-5 indicated a very poor uniformity and poor visual quality of the outer layer, whereas Example 1 exhibited very high surface uniformity of the outer layer. This indicated that the outer layer thickness in C-4 and C-5, comprising semiaromatic semicrystalline polyamides having melt temperatures 200° C. to 218° C., respectively, and below the specified range of 240° C. to 280° C. range, could not be adequately controlled to provide a uniform multi-layered tube.

Example 2

Tensile Test specimens of an outer layer composition and inner layer compositions, as listed in Table 6 in parts by weight, were subjected to air oven ageing (AOA) at 135° C. over 3000 h, followed by tensile test measurements at various times.

TABLE 6

| Material | Outer Layer | Inner Layer |
|---|---|---|
| Polyamide A | 83.72 | |
| Polyamide B | | 8.72 |
| TRX-301 | 8.44 | 8.44 |
| Egage ® 8180 | 6.46 | 6.46 |
| C-Black | | |
| Irganox ® 1010 | | |
| Irganox ® 1098 | 0.3 | 0.3 |
| Irgafos 12 | | |
| Chimassorb ® 944 | | |
| Acrawax C | | |
| HS 7.1.0.5 | 0.88 | 0.88 |
| NylostabS-EED | 0.2 | 0.2 |
| Total | 100 | 100 |

The results listed in Table 8, indicate that the inner layer shows dramatic decrease in percent strain at break after 3000 h ageing, corresponding to only a 9.4 percent retention of strain at break. The results listed in Table 7 indicate that the outer layer of polyamide 10,T/10,10 shows about 75 percent retention of percent strain at break after 3000 h ageing.

TABLE 7

Tensile Properties of Example 2 Outer Layer after AOA at 135° C.

| h | Tensile Modulus GPa | Stress at Yield MPa | Strain at Yield % | Stress at Break Mpa | Strain at Break % |
|---|---|---|---|---|---|
| 0 | 1800 | 56 | 5.2 | 42.9 | 33.1 |
| 72 | 1793 | 59.9 | 5.7 | 46 | 23.7 |
| 250 | 1805 | 59 | 5.7 | 45.6 | 33.1 |
| 500 | 1832 | 59.2 | 5.6 | 46.6 | 31.7 |
| 1000 | 1813 | 60.1 | 5.7 | 47.2 | 25.2 |
| 2000 | 1815 | 60.2 | 5.6 | 47.2 | 26.7 |
| 3000 | 1814 | 60.1 | 5.7 | 47.6 | 24.6 |

TABLE 8

Tensile Properties of Example 2 Inner Layer after AOA at 135° C.

| h | Tensile Modulus GPa | Stress at Yield MPa | Strain at Yield % | Stress at Break Mpa | Strain at Break % |
|---|---|---|---|---|---|
| 0 | 2407 | 67.7 | 6 | 54.6 | 23.4 |
| 72 | 2089 | 69.6 | 6.3 | 56.4 | 29.8 |
| 250 | 2221 | 71.9 | 5.9 | 61.9 | 9.1 |
| 500 | 2258 | 73.2 | 6.1 | 63.2 | 19.2 |
| 1000 | 2301 | 74.6 | 6.1 | 66.5 | 8.9 |
| 2000 | 2301 | — | — | 58.4 | 3 |
| 3000 | 2291 | — | — | 46.2 | 2.2 |

Example 2 indicates that the a multi-layered tube having polyamide 10,T/10,10 as the outer layer would be expected to retain significant % strain at break under heat ageing. That is, the tube would be expected to maintain flexibility, so long as the inner layer is not exposed to air. Thus, the tubing would have a combination of high AOA heat stability; and improved burst pressure relative to a single layer of polyamide 10,T/10, 10.

The invention claimed is:

1. A multi-layered co-extruded tube comprising
A) an outer layer comprising a first polymer composition comprising a first semiaromatic semicrystalline polyamide and a copper thermal stabilizer, said first semiaromatic semicrystalline polyamide consisting essentially of
   a) at least one repeat unit derived from monomers selected from one or more of the group consisting of:
      (i) aromatic dicarboxylic acid having 8 to 20 carbon atoms and at least one aliphatic diamine having 6 to 12 carbon atoms, and
   a) at least one repeat unit derived from monomers selected from one or more of the group consisting of:
      (ii) aliphatic dicarboxylic acid having 10 to 14 carbon atoms and at least one aliphatic diamine having 6 to 12 carbon atoms, and
      (iii) lactam and/or aminocarboxylic acid having 6 to 20 carbon atoms; and
B) an inner layer comprising a second polymer composition comprising a second semiaromatic semicrystalline polyamide;
wherein said first semiaromatic semicrystalline polyamide has a melt temperature of about 240° C. to 280° C.; and said second semiaromatic semicrystalline polyamide has a glass transition temperature equal to or greater than 100° C. as measured with dynamic mechanical analysis using ISO-6721-3 method.

2. The multi-layered co-extruded tube of claim 1 wherein said second semiaromatic semicrystalline polyamide consists essentially of
   c) at least one repeat unit derived from monomers selected from the group consisting of
      (iv) aromatic dicarboxylic acid having 8 to 20 carbon atoms and at least one aliphatic diamine having 6 to 10 carbon atoms, and optionally
   d) one or more repeat units derived from monomers selected from the group consisting of
      (v) aliphatic dicarboxylic acid having 6 to 14 carbon atoms and at least one aliphatic diamine having 6 to 10 carbon atoms, and
      (vi) lactam and/or aminocarboxylic acid having 6 to 20 carbon atoms.

3. The multi-layered co-extruded tube of claim 1 wherein said second semiaromatic semicrystalline polyamide has a melting temperature greater than 270° C.

4. The multi-layered co-extruded tube of claim 1 wherein said second semiaromatic semicrystalline polyamide has a glass transition temperature equal to or greater than 125° C.

5. The multi-layered tube of claim 1 wherein said copper thermal stabilizer comprises about 0.1 to about 1.0 weight percent of a copper species selected from Cu(I), Cu(II), or a mixture thereof, based on the weight of the first polymer composition.

6. The multi-layered tube of claim 1 wherein said second polymer composition does not contain a Cu thermal stabilizer.

7. The multi-layered tube of claim 1 wherein said outer layer semiaromatic polyamide is selected from the group consisting of Group I polyamides having a terephthalic acid content of 60 to about 80 mol %, based on the total dicarboxylic acid content, selected from the group consisting of decamethylene terephthalamide|decamethylene decanediamide and decamethylene terephthalamide/decamethylene dodecanediamide; and Group II polyamides having a terephthalic acid content of 50 to about 80 mol %, based on the a total of acid repeat units, selected from the group consisting of nonamethylene terephthalamide/nonamethylene decanediamide, nonamethylene terephthalamide/ nonamethylene dodecanediamide, nonamethylene terephthalamide/ 11-aminoundecanamide (PA 9T/11), nonamethylene terephthalamide/lauryl lactam, decamethylene terephthalamidei-aminoundecanamide (PA 10T/11), and decamethylene terephthalamide|lauryl lactam.

8. The multi-layered co-extruded tube of claim 2 wherein said second semiaromatic semicrystalline polyamide consists essentially of (c) repeat units (iv) wherein said at least one aliphatic diamine has 6 carbon atoms.

9. The multi-layered tube of claim 1 wherein said inner layer semiaromatic polyamide is selected from the group consisting of hexamethylene terephthalamide/2-methylpentamethylene terephthalamide copolyamide, hexamethylene terephthalamide/hexamethylene isophthalamide, hexamethylene adipamide/hexamethylene terephthalamide/hexamethylene isophthalamide copolyamide; hexamethylene terephthalamide| poly(caprolactam), poly(nonamethylene terephthalamide), and poly(decamethylene terephthalamide).

10. The multi-layered tube of claim 1 wherein the first polymer composition further comprises about 2 to about 50 weight percent of a polymeric toughener.

11. The multi-layered tube of claim 1 or 10 wherein the second polymer composition further comprises 2 to about 50 weight percent of a polymeric toughener.

* * * * *